May 31, 1927.
H. BONAWITZ
RESILIENT TIRE
Filed May 9, 1925
1,630,776
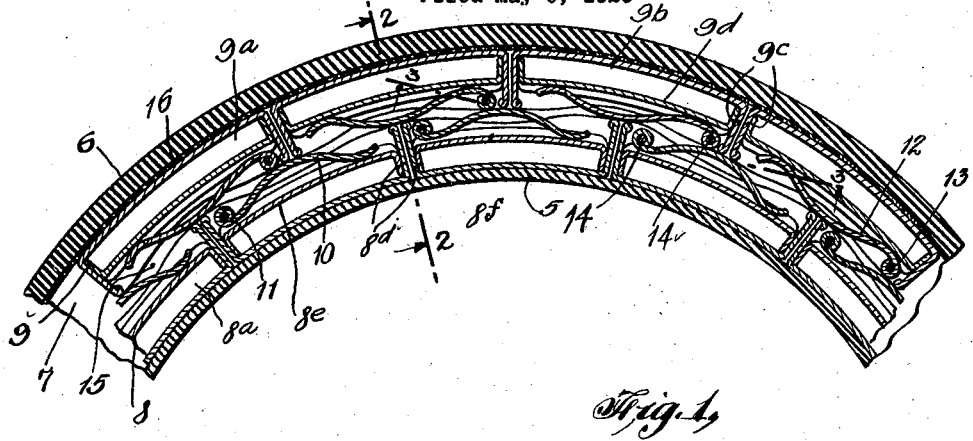
Fig. 1.
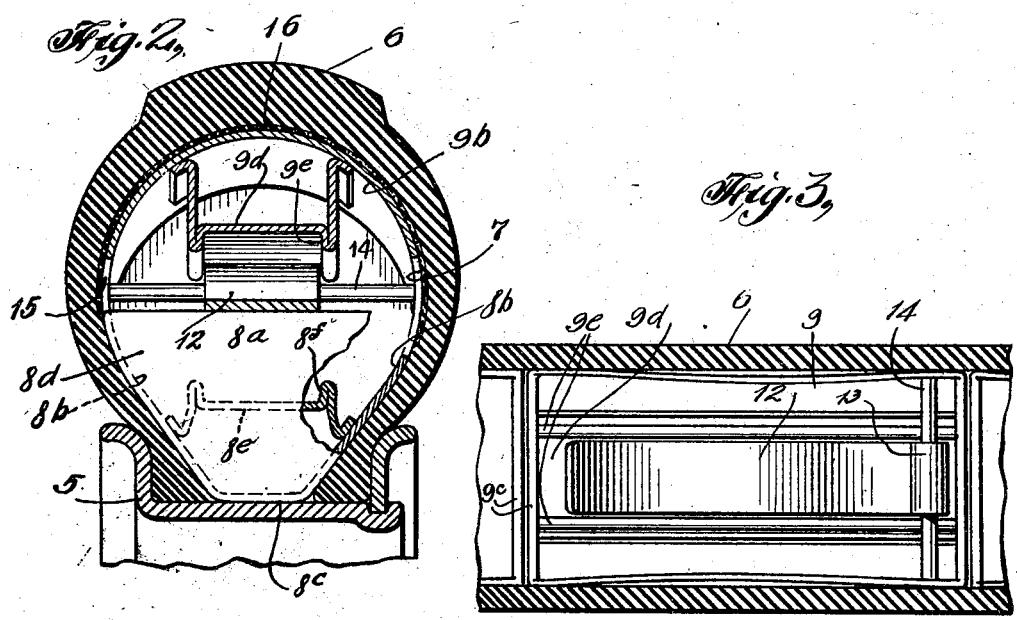
Fig. 2.
Fig. 3.
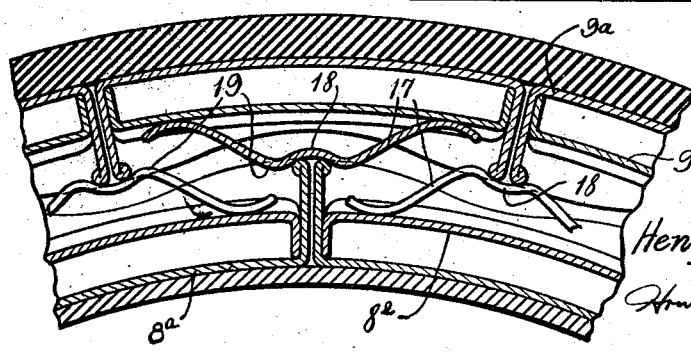
Fig. 4.
INVENTOR
Henry Bonawitz
BY
Howard C. Thompson
ATTORNEY Patented May 31, 1927.

1,630,776

UNITED STATES PATENT OFFICE.

HENRY BONAWITZ, OF BROOKLYN, NEW YORK.

RESILIENT TIRE.

Application filed May 9, 1925. Serial No. 29,101.

This invention relates to resilient tires and particularly to devices of this class employing the usual shoe of resilient or elastic material and particularly to the provision of a substitute for the inflatable tube of tires as commonly employed; the object of the invention being to provide a substitute for the pneumatic tube comprising a series of resilient members or elements mounted in juxtaposition within the chamber or compartment of the shoe and being arranged in the form of two annular sections one of which is adjacent the rim portion of a wheel and the other encircling the first and arranged adjacent the tread portion of the shoe; a further object being to provide the separate members or elements with springs or other resilient devices in connection with which the end portions of the members or elements of the inner and outer sections cooperate, it being understood that the members or elements of the inner section cooperate with two of the members or elements of the outer section and vice versa; and with these and other objects in view, the invention consists in a device of the class and for the purpose specified, which is simple in construction and operation and efficient in use and which is constructed as hereinafter described and claimed.

The invention is fully disclosed in the following specification, of which the accompanying drawing forms a part, in which the separate parts of my improvement are designated by suitable reference characters in each of the views and in which:—

Fig. 1 is a longitudinal sectional view through a part of a tire made according to my invention and indicating the rim of such tire.

Fig. 2 is a section on the line 2—2 of Fig. 1 and on an enlarged scale.

Fig. 3 is an inside sectional view of the tire showing one of the members or elements which I employ in detail, and mounted in said tire; and, Fig. 4 is a view similar to Fig. 1 but showing only a part of the construction on an enlarged scale and showing a modification.

In the drawing, I have indicated at 5 the rim of a wheel, which rim may be of any desired form and construction and on which the shoe 6 of a tire is adapted to be mounted. The shoe 6 is of the usual or well-known form and construction and is constructed to suit the purpose for which it is intended. In practice I provide a substitute for the usual inflatable tube which is adapted to take the place of the tube and to be mounted in the chamber 7 of the shoe 6.

The substitute which I employ comprises two annular inner and outer sections 8 and 9, the inner section being located adjacent the rim 5 of the wheel while the outer section is arranged adjacent the tread portion of the shoe 6. Each of the sections 8 and 9 are composed of a plurality of members or units $8^a$ and $9^a$ respectively. The members $8^a$ each comprise a casing having diverging side walls $8^b$ flattened where they join as seen at $8^c$ to rest upon the rim 5 and end walls $8^d$ which extend in radial planes and the outer ends of which are rounded as seen in Fig. 1 of the drawing. A bearing plate $8^e$ is mounted transversely of and between the side walls $8^b$ and extends from one end wall $8^d$ to the other, the central part of said plate being of channel formation and the channel $8^f$ thereof being directed outwardly with reference to the axis of the wheel or the tire. In the construction employed, in Figs. 1 to 3 inclusive, the members $8^a$ are each provided with a leaf spring 10 pivoted at one end of each member as seen at 11 and bowed at the center thereof outwardly, and the free end of which rests within the channel $8^f$ and upon the face of the plate $8^e$. It will be noted that the side walls $8^b$ of the members $8^a$ are fashioned to conform with the contour of the walls of the chamber 7 formed by the shoe 6 in order that the side members $8^a$ will fit snugly therein.

The members $9^a$ are each fashioned from a casing having a substantially semi-circular wall $9^b$ the concave face of which is directed inwardly and radially and said wall being adapted to fit snugly within the contour of the tread portion of the shoe 6 as seen in Fig. 2 of the drawing and the casing is provided with radially extending end walls $9^c$ rounded at their inner ends to engage the central rounded portions of the springs 10 mounted in connection with the members $8^a$. A transverse bearing plate $9^d$ is mounted within the concave face of the casing $9^b$ and extends from one end wall $9^c$ to the other within said casing and is provided with a channel 9ᶜ which is directed inwardly and radially. A spring 12 similar to the spring 10 is mounted in connection with each of the members 9ᵃ one end of said spring being pivoted as seen at 13 to the casing 9ᵇ and said spring being bowed inwardly at the central portion thereof, and the free end of the spring rests upon the plate 9ᵈ. It will be noted that the rounded ends of the end walls 8ᵈ of the members 8ᵃ bear upon the central portion of the springs 12. The pivotal mounting of the springs 10 and 12 at 11 and 13 respectively is made by rods 14 riveted or otherwise secured to the casings of the separate members 8ᵃ and 9ᵃ.

From the foregoing, it will be apparent that in mounting the separate sections 8 and 9 in the chamber 7 of a shoe 6, the members 8ᵃ are arranged with reference to the members 9ᵃ in such manner that the end walls of one of the members 8ᵃ engages the springs 12 of two of the members 9ᵃ; likewise, the end walls of the members 9ᵃ engage the springs 10 of two of the members 8ᵃ; in other words, the members 8 and 9 interlock. The side walls of the members 8ᵃ and 9ᵃ are spaced apart as seen at 15 to prevent said walls coming in contact when the tire is in use.

It will also be apparent that the separate members 8ᵃ and 9ᵃ are placed within the chamber 7 under tension or with tension upon the springs 10 and 12 of the respective members. It is preferred that this tension will be sufficient or substantially sufficient to sustain a vehicle when the tires are mounted on the wheels thereof, and in the progress of the vehicle over a rough or irregular roadway, the springs 10 and 12 will compensate for the shock and render the tires resilient as will be apparent. It is also preferred that a facing 16 of asbestos be employed between the tread portion of the shoe 6 and the outer face of the members 9 to act as a heat insulator, this facing being shown in Fig. 2 only but it will be understood that the same may be employed with any form of my invention and carried into effect in accordance with the following claims.

In Fig. 4 of the drawing, I have shown a slight modification, in which the members 8ᵃ and 9ᵃ are of the same construction as shown in Figs. 1 to 3 inclusive except that the springs 10 and 12 and their pivotal mounting are omitted and substituted therefore are springs 17 employed in connection with both members 8ᵃ and 9ᵃ and the curved ends of said springs resting within the channels 8ᶠ and 9ᵉ thereof. The ends of the springs 17 are free and unattached and said springs are provided centrally with depressed portions 18 in which the end walls 8ᵈ and 9ᶜ are adapted to operate. This construction serves to prevent the displacement of the springs 17 and also strengthens and reinforces the central bowed portions 19 of said springs.

The operation of the tire as shown in Fig. 4 will be the same as the construction shown in Figs. 1 to 3, inclusive, it being possible however that a greater amount of resiliency will be produced in the tire shown in Fig. 4 than that first described.

It will be understood that while I have shown and described certain details of construction for carrying my invention into effect, that I am not necessarily limited to the specific construction herein shown and described and various changes therein and modifications thereof may be made within the scope of the appended claims without departing from the spirit of my invention or sacrificing its advantages.

Having fully described my invention, what I claim as new and desire to secure by Letters Patent, is:—

1. A device of the class described comprising two annular sections, each of said sections being composed of a plurality of similar and independently formed members, resilient means on each of said members, and radially extending means on the separate members of each section adapted to contact with the adjacent member of the said section and to engage the resilient means on the adjacent member of the other section.

2. A device of the class described comprising two annular resilient sections adapted to be mounted within a tire shoe and spaced from each other, each of said sections being composed of a plurality of similar and independently formed members, radially extending means on each member of each section, the ends of the radially extending means being spaced from the members of the other section, and a curved spring for each member of each section having its ends contacting with said member and its central portion engaging the radially extending means of the adjacent member of the other section.

3. A device of the class described comprising two annular sections, each of said sections being composed of a plurality of similar and independently formed members with the end walls of said members in contact with each other, and a spring mounted in each of said members and engaging the end walls of the adjacent members of the other section to provide a resilient distension when the device is placed in a tire shoe and is in use.

4. A device of the class described comprising two annular sections, each of said sections being composed of a plurality of similar and independently formed members with the end walls of said members in contact with each other, said device being adapted to be arranged within a tire shoe, and a curved spring carried by each of said members and adapted to be engaged by the end walls of the adjacent members of the other section to provide a resilient distension of the shoe when the tire is in use.

5. A device of the class described, comprising two annular resilient sections adapted to be mounted within a tire shoe and spaced from each other, each of said sections being composed of a plurality of independently formed members, and a curved spring for each member of each section having a portion contacting with said member and having portions contacting with the adjacent members of the other section.

In testimony that I claim the foregoing as my invention I have signed my name this 7th day of May, 1925.

HENRY BONAWITZ.